(12) United States Patent
Kim et al.

(10) Patent No.: US 11,758,241 B2
(45) Date of Patent: Sep. 12, 2023

(54) METHOD AND APPARATUS FOR PLAYING BACK VIDEO IN ACCORDANCE WITH REQUESTED VIDEO PLAYBACK TIME

(71) Applicant: HANWHA TECHWIN CO., LTD., Seongnam-si (KR)

(72) Inventors: Hyun Ho Kim, Seongnam-si (KR); Jae Young Shin, Seongnam-si (KR); Young In Yun, Seongnam-si (KR); Jeong Koo Kang, Seongnam-si (KR)

(73) Assignee: HANWHA TECHWIN CO., LTD., Seongnam-si (KR)

( * ) Notice: Subject to any disclaimer, the term of this patent is extended or adjusted under 35 U.S.C. 154(b) by 0 days.

(21) Appl. No.: 17/380,407

(22) Filed: Jul. 20, 2021

(65) Prior Publication Data

US 2021/0352378 A1 Nov. 11, 2021

Related U.S. Application Data

(63) Continuation of application No. PCT/KR2019/004215, filed on Apr. 9, 2019.

(30) Foreign Application Priority Data

Feb. 11, 2019 (KR) .................. 10-2019-0015438

(51) Int. Cl.
*H04N 21/2387* (2011.01)
*H04N 21/6587* (2011.01)
(Continued)

(52) U.S. Cl.
CPC ..... *H04N 21/6587* (2013.01); *H04N 21/2387* (2013.01); *H04N 21/438* (2013.01); *H04N 21/47217* (2013.01)

(58) Field of Classification Search
CPC .......... H04N 21/6587; H04N 21/2387; H04N 21/438; H04N 21/47217;
(Continued)

(56) References Cited

U.S. PATENT DOCUMENTS

2004/0075678 A1 4/2004 Kazui et al.
2006/0126667 A1* 6/2006 Smith .............. H04N 21/26616
348/E7.071
(Continued)

FOREIGN PATENT DOCUMENTS

CN 102264004 A 11/2011
EP 1271953 A2 1/2003
(Continued)

OTHER PUBLICATIONS

International Search Report dated Aug. 9, 2019 issued by the International Searching Authority in counterpart International Application No. PCT/KR2019/004215 (PCT/ISA/210).
(Continued)

*Primary Examiner* — John R Schnurr
(74) *Attorney, Agent, or Firm* — Sughrue Mion, PLLC

(57) ABSTRACT

A video playback method is provided. According to the method, a frame before requested video playback time is transmitted and received without speed limitation to perform decoding without video play back, and a frame after the video playback time is transmitted and received in accordance with playback speed to perform decoding and video playback, thereby quickly playing back a video in accordance with video playback time requested by a user without changing Group Of Video (GOV) setting or codec setting.

19 Claims, 9 Drawing Sheets

(51) Int. Cl.
*H04N 21/438* (2011.01)
*H04N 21/472* (2011.01)

(58) Field of Classification Search
CPC ....... H04N 21/234345; H04N 21/2393; H04N 21/2343; H04N 21/4402
See application file for complete search history.

(56) References Cited

U.S. PATENT DOCUMENTS

| | | | | |
|---|---|---|---|---|
| 2010/0050209 A1* | 2/2010 | Price | ............ | H04N 19/61 |
| | | | | 386/241 |
| 2012/0155280 A1* | 6/2012 | Wu | ............ | H04L 65/752 |
| | | | | 370/241 |
| 2012/0163771 A1* | 6/2012 | Li | ............ | H04N 21/8455 |
| | | | | 386/E9.011 |
| 2013/0339997 A1* | 12/2013 | Farkash | ............ | H04N 21/23439 |
| | | | | 725/31 |
| 2014/0269932 A1* | 9/2014 | Su | ............ | H04N 21/23439 |
| | | | | 375/240.25 |
| 2015/0179224 A1* | 6/2015 | Bloch | ............ | H04N 21/2387 |
| | | | | 386/241 |
| 2016/0100230 A1* | 4/2016 | Ma | ............ | H04N 21/4425 |
| | | | | 725/109 |
| 2016/0329080 A1* | 11/2016 | Singh | ............ | G11B 27/11 |
| 2017/0155697 A1* | 6/2017 | Gang | ............ | H04L 67/02 |
| 2018/0034883 A1* | 2/2018 | Kim | ............ | H04L 65/65 |
| 2018/0255362 A1* | 9/2018 | Chittella | ............ | H04N 21/234363 |
| 2019/0272088 A1* | 9/2019 | Liu | ............ | H04N 21/2393 |
| 2019/0364302 A1* | 11/2019 | Perlman | ............ | H04N 19/436 |
| 2021/0168437 A1* | 6/2021 | Lee | ............ | H04N 21/4302 |

FOREIGN PATENT DOCUMENTS

| | | |
|---|---|---|
| EP | 3249652 A1 | 11/2017 |
| JP | 2006-345169 A | 12/2006 |
| KR | 10-2006-0110427 A | 10/2006 |
| WO | 2007/099978 A1 | 9/2007 |

OTHER PUBLICATIONS

International Written Opinion dated Aug. 9, 2019 issued by the International Searching Authority in counterpart International Application No. PCT/KR2019/004215 (PCT/ISA/237).

* cited by examiner

【Figure 1】
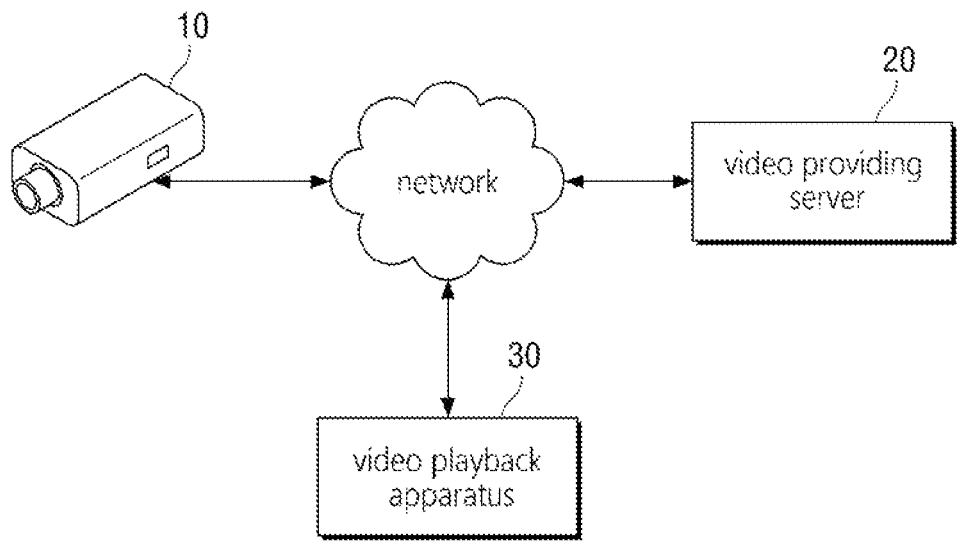
【Figure 2】
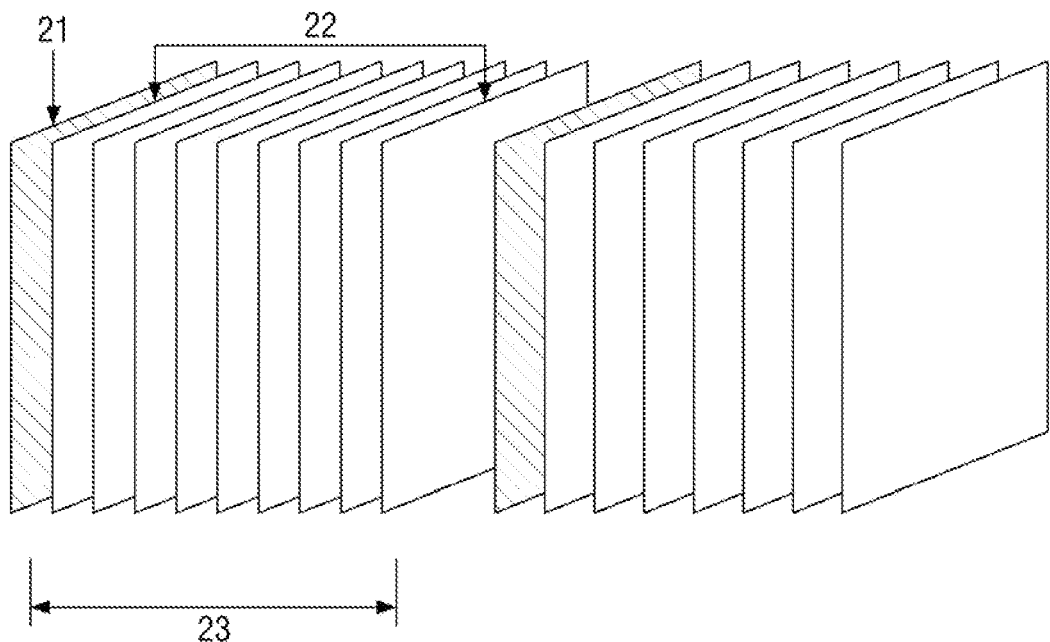

【Figure 3a】
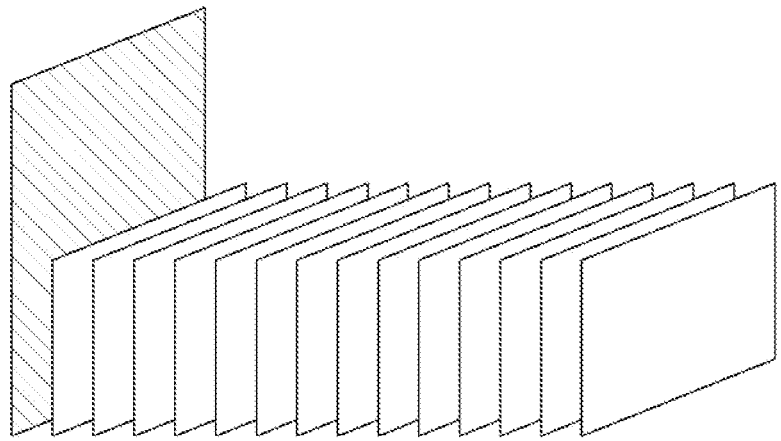
【Figure 3b】
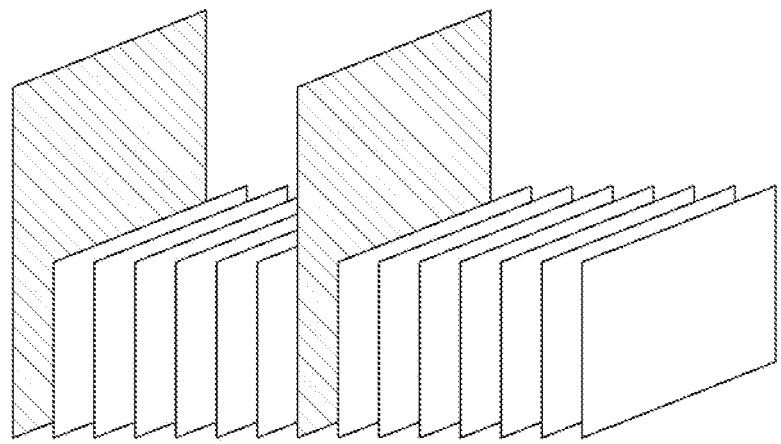

[Figure 4]
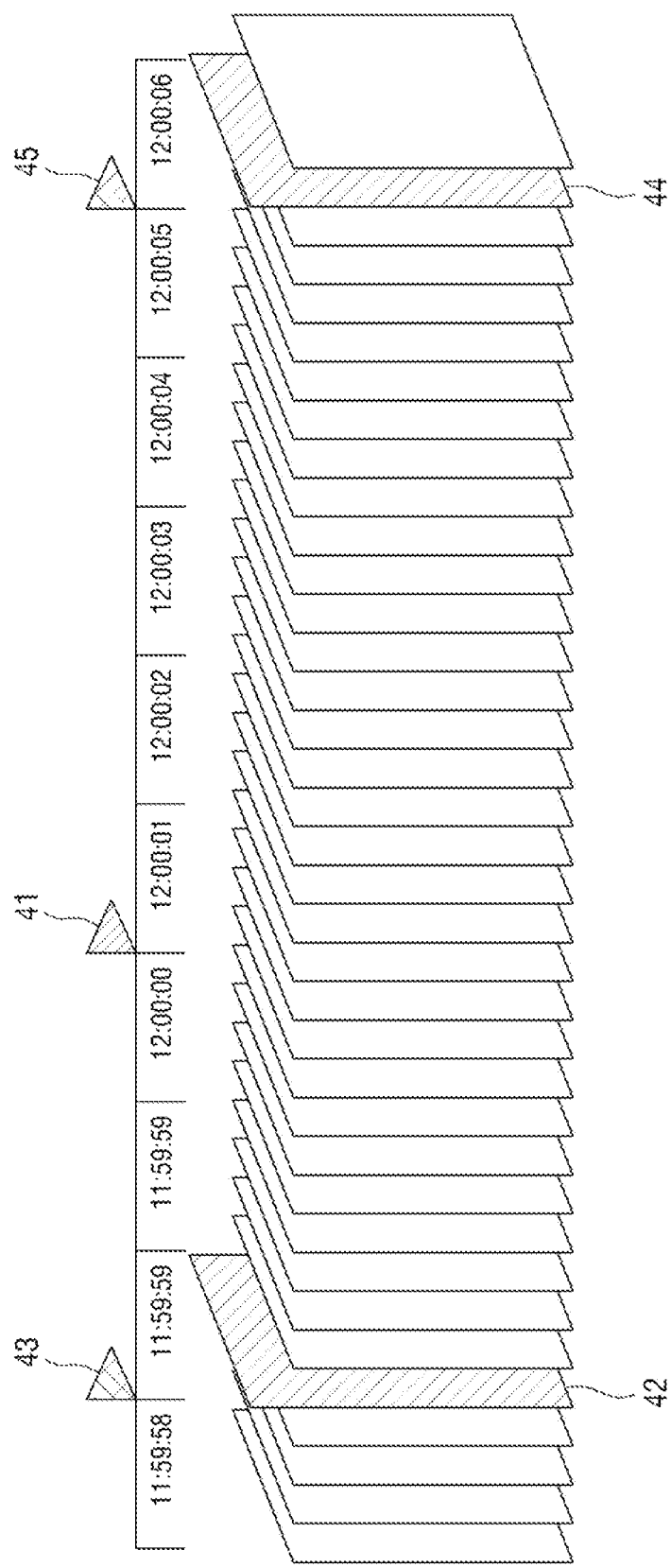

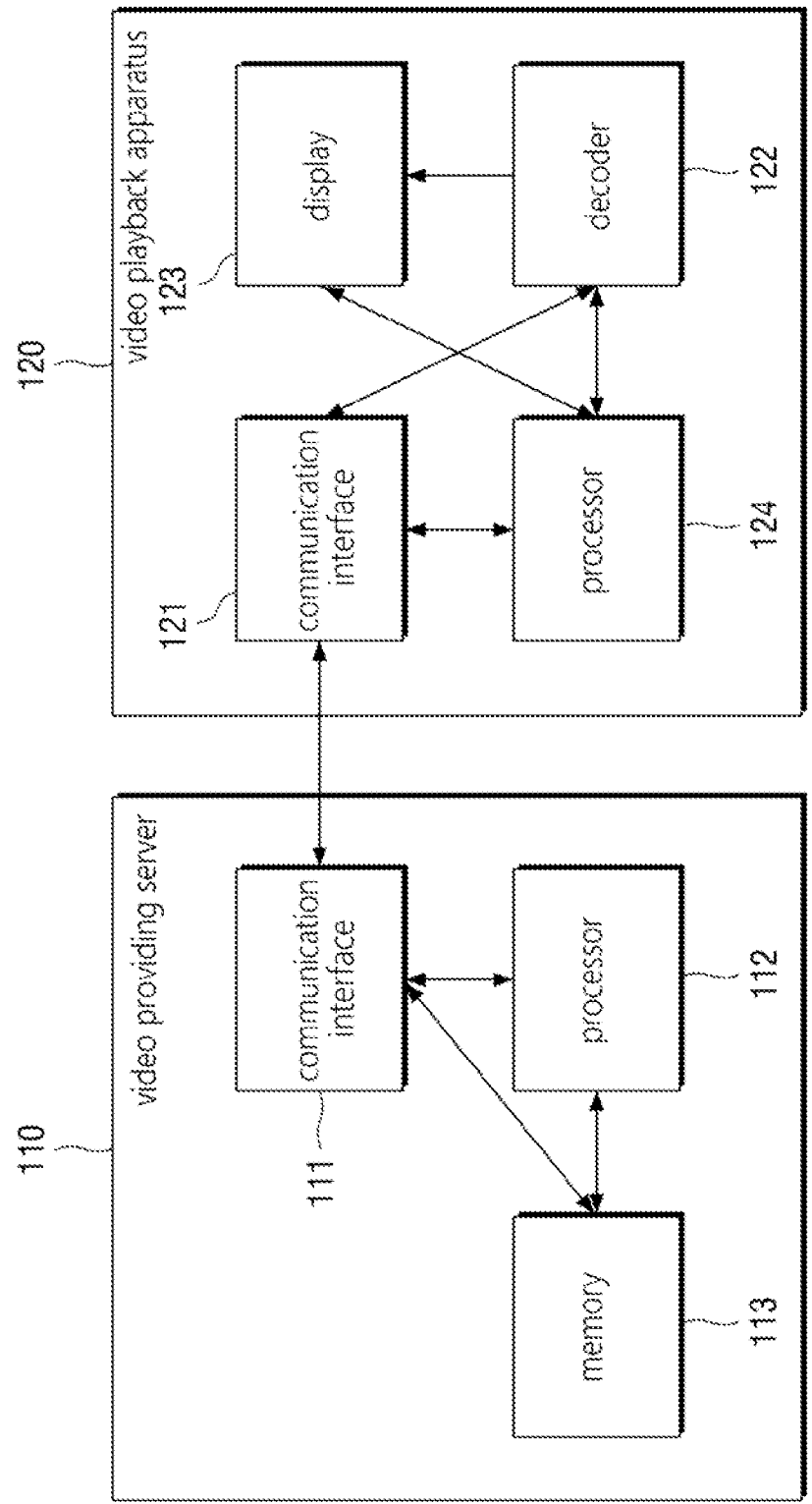
[Figure 5]

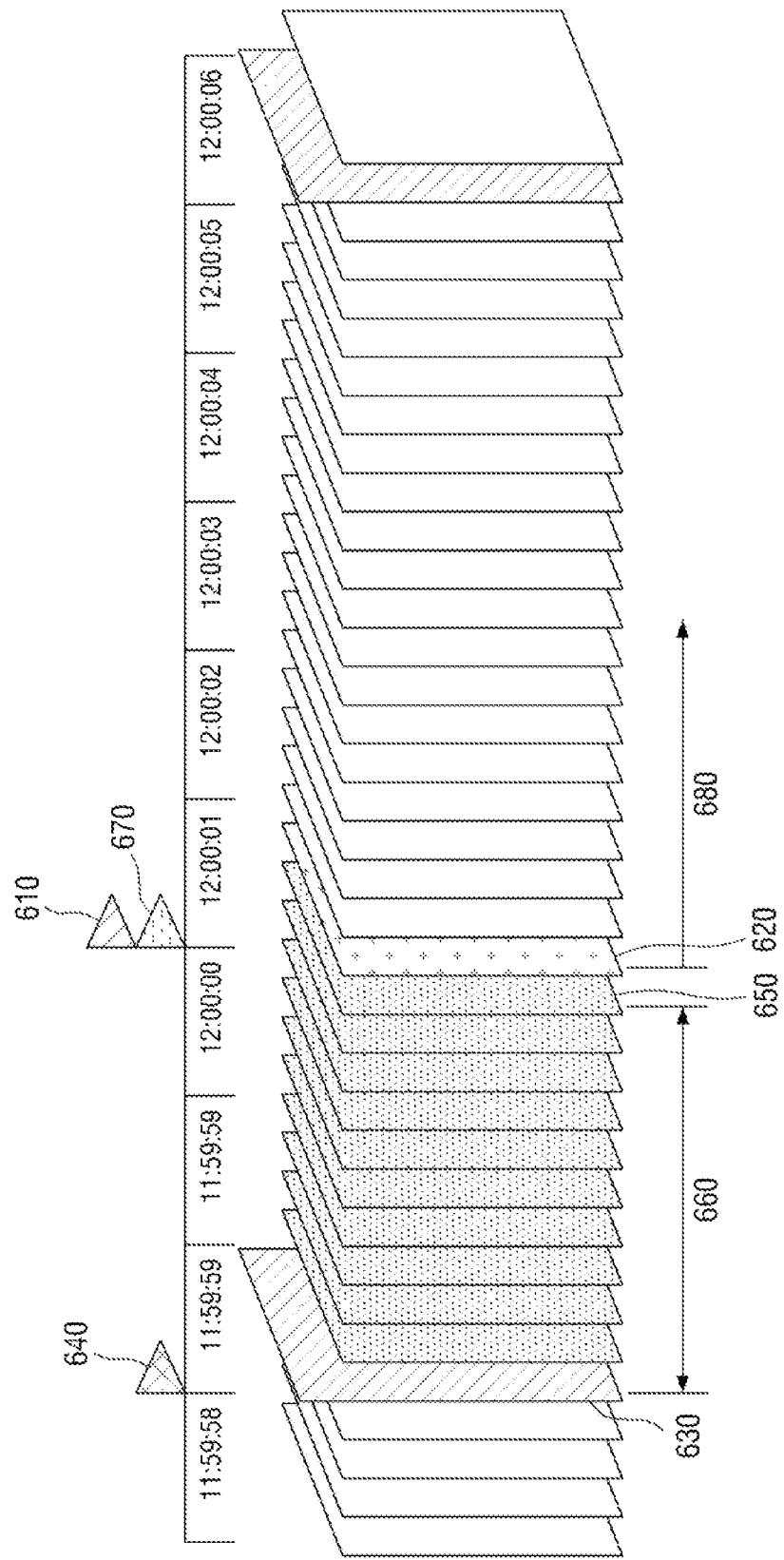
[Figure 6]

[Figure 7]
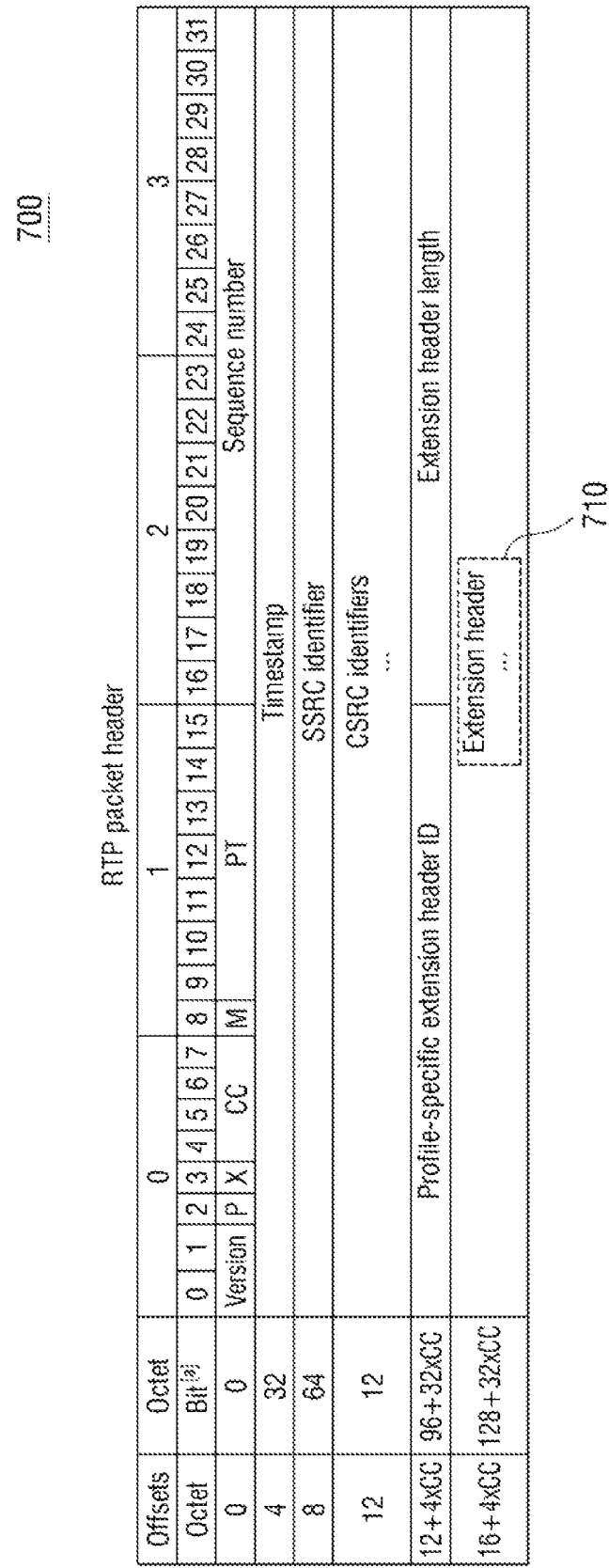

[Figure 8]
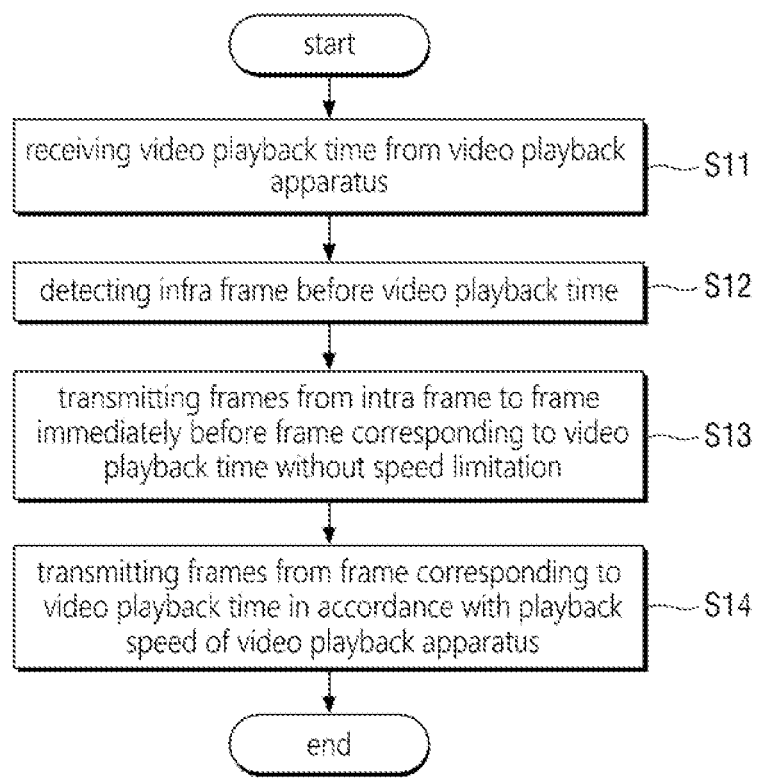

[Figure 9]
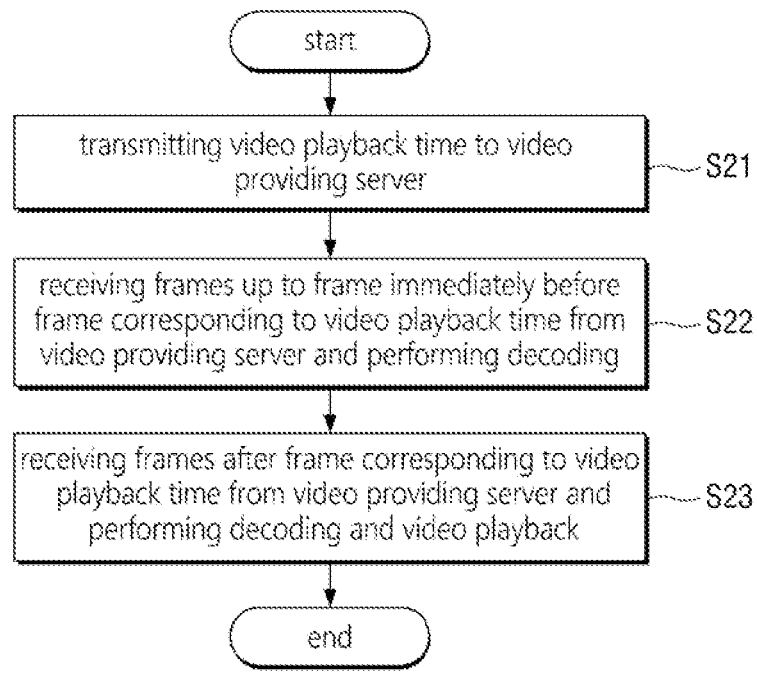

【Figure 10】
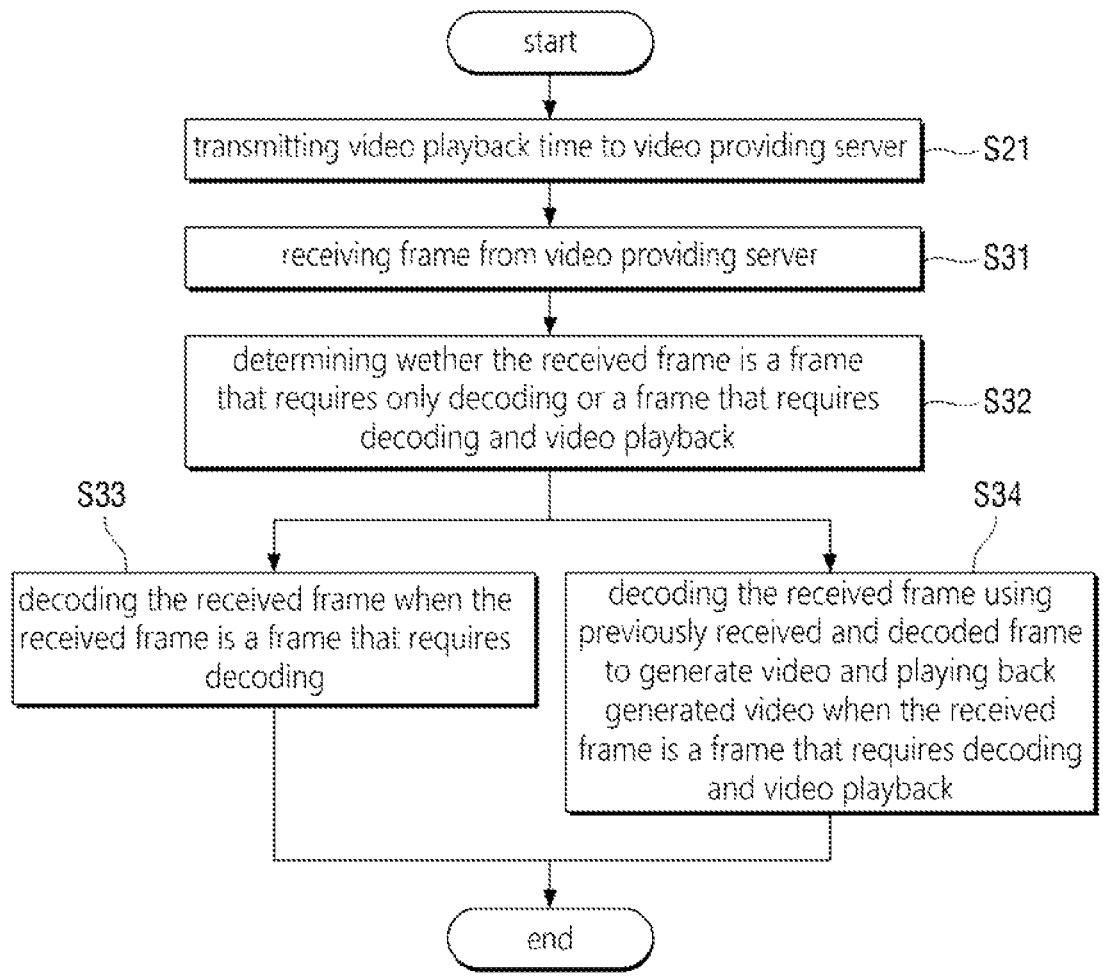

METHOD AND APPARATUS FOR PLAYING BACK VIDEO IN ACCORDANCE WITH REQUESTED VIDEO PLAYBACK TIME

CROSS-REFERENCE TO THE RELATED APPLICATION(S)

This application is a bypass continuation application of International Application No. PCT/KR2019/004215, filed on Apr. 9, 2019, which claims priority to Korean Patent Application No. 10-2019-0015438, filed with the Korean Intellectual Property Office on Feb. 11, 2019, the disclosures of which are incorporated by reference in their entireties.

FIELD

The disclosure relates to a video playback method, and, more particularly, to a method of providing a video data to play back a video in accordance with requested video playback time, a method of playing back a video, a video providing server, and a video playback apparatus.

BACKGROUND

Video codecs such as H.264 and H.265 are the most commonly used formats for video recording, and are characterized by good picture quality compared to a low bit rate. Video frames compressed by such codecs are divided into I-frame (intra coded picture) which is capable of independent decoding, and P-frame (forward predicted picture) and B-frame (bidirectionally predicted picture) which perform decoding based on the relation information with other frames. The interval between Intra frame and Inter frame such as P-frame or B-frame is referred to as Group Of Video (GOV) or Group of Pictures (GOP), and a transmission bit rate decreases as GOV increases.

In order to minimize a network bandwidth or a storage bandwidth, there is provided a method of setting a GOV value to a large value or supporting variable GOV and variable frames per second (FPS) in a camera. Since the size of a video generally decreases when such a method is applied, a device where a network bandwidth and a storage capacity are important, such as a network camera or a storage device, is widely used.

On the other hand, when the GOV value is set to a large value, the frequency of intra frames capable of independent decoding decreases when playing back a recorded video, so that there may be a difference between playback request time and playback time of an actual video.

Thus, in the related art, there is a problem that the user cannot accurately play back the video at the time designated by the user, and depending on the function and specification of the storage device that stores the video, the user can only play back the video at a location of a previous intra frame that is nearest to the designated time or at a location of a next intra frame that is nearest to the designated time.

SUMMARY

The disclosure has been made to solve the above-mentioned problems occurring in the related art, and an object to be achieved by the disclosure is to provide a method of providing video data to play back a video in accordance with requested video playback time.

Another object to be achieved by the disclosure is to provide a method of playing back a video in accordance with requested video playback time.

Still another object to be achieved by the disclosure is to provide a video providing server for providing video data to play back a video in accordance with requested video playback time.

Still another object to be achieved by the disclosure is to provide a video playback apparatus for playing back a video in accordance with requested video playback time.

However, technical objects of the present disclosure are not restricted to the technical object mentioned as above. Unmentioned technical objects will be apparently appreciated by those skilled in the art by referencing the following description.

According to an aspect of an example embodiment, provided is a method of providing video data, performed by a video providing server, the method including: receiving, from a video playback apparatus, a video playback time of a video; detecting, in the video, an intra frame positioned before a first frame corresponding to the video playback time; transmitting frames from the intra frame to a second frame, the second frame being positioned immediately before the first frame, without speed limitation; and transmitting a frame from the first frame in accordance with a playback speed of the video playback apparatus.

The transmitting the frames may include transmitting the frames from the intra frame to the second frame at a maximum transmission speed.

The transmitting the frames may include transmitting the frames from the intra frame to the second frame with a highest priority.

The transmitting the frames may include transmitting the frames from the intra frame to the second frame, based on information indicating that each of the transmitted frames is a frame that requires decoding by the video playback apparatus without video playback.

The transmitting the frame may include transmitting the frame from the first frame in accordance with the playback speed of the video playback apparatus, based on information indicating that the transmitted frame is a frame that requires decoding and playback by the video playback apparatus.

According to an aspect of an example embodiment, provided is a method of playing back a video, performed by a video playback apparatus, the method including: transmitting a video playback time of a first video to a video providing server, the video playback time corresponding to a first frame in the first video; receiving, from the video providing server, frames up to a second frame positioned immediately before the first frame in the first video and performing first decoding of the received frames up to the second frame; and receiving, from the video providing server, frames from and after the first frame corresponding and performing second decoding and video playback of the received frames from the first frame.

The receiving the frames up to the second frame may include receiving, from the video providing server, the frames up to the second frame without speed limitation.

The receiving the frames up to the second frame may include receiving, from the video providing server, the frames up to the second frame at a maximum speed at which the video providing server is capable of transmitting the frames.

The receiving the frames up to the second frame and performing the first decoding may include: receiving a frame from the video providing server; determining whether the received frame is a frame that requires decoding without video playback or a frame that requires decoding and video playback; and decoding the received frame based on a determination that the received frame is the frame that requires decoding without video playback.

The receiving the frames from and after the first frame and performing the second decoding and video playback may include: receiving the frame from the video providing server; determining whether the received frame is a frame that requires decoding without video playback or a frame that requires decoding and video playback; and decoding the received fame using a previously received and decoded frame to generate a second video and playing back the generated second video, based on a determination that the received frame is the frame that requires decoding and video playback.

According to an aspect of an example embodiment, provided is a video providing server, including: a communication interface configured to receive a video playback time of a video from a video playback apparatus and transmit video data to the video playback apparatus by a unit of frame; and at least one processor configured to: detect, in the video, an intra frame positioned before a first frame corresponding to the video playback time; transmit, via the communication interface, frames from the intra frame to a second frame, the second frame being positioned immediately before the first frame without speed limitation; and transmit, via the communication interface, a frame from the first frame in accordance with a playback speed of the video playback apparatus.

The at least one processor may be further configured to transmit, via the communication interface, the frames from the intra frame to the second frame at a maximum speed.

The at least one processor may be further configured to transmit, via the communication interface, the frames from the intra frame to the second frame with a highest priority.

The at least one processor may be further configured to transmit the frames from the intra frame to the second frame based on information indicating that each of the transmitted frames is a frame that requires decoding by the video playback apparatus without video playback.

The at least one processor may be further configured to transmit the frame from the first frame based on information indicating that the transmitted frame is a frame that requires decoding and video playback by the video playback apparatus.

According to an aspect of an example embodiment, provided is a video playback apparatus, including: a communication interface configured to transmit a video playback time of a first video to a video providing server and receive video data from the video providing server by a unit of frame; a decoder configured to decode a frame received from the video providing server; and a display configured to display a second video generated by decoding the received frame, wherein the second video is generated from a first frame corresponding to the video playback time.

The communication interface may be further configured to receive the frame from the video providing server without speed limitation up to a second frame, the second frame being positioned immediately before the first frame.

The communication interface may be further configured to receive the frame from the video providing server without speed limitation up to a second frame, the second frame being positioned immediately before the first frame, at a maximum speed at which the video providing server is capable of transmitting the frame.

The video playback apparatus may further include at least one processor configured to determine whether the received frame is a frame that requires decoding without video playback or a frame that requires decoding and video playback.

The at least one processor may be further configured to control the decoder and the display such that the decoder decodes the received frame and the display does not display a video based on the received frame, based on a determination that the received frame is the frame that requires decoding without video playback, and wherein the at least one processor is further configured to control the decoder and the display such that the decoder decodes the received frame using a previously received and decoded frame to generate the second video, and the display plays back the generated second video, based on a determination that the received frame is the frame that requires decoding and video playback.

DESCRIPTION OF DRAWINGS

The aspects and features of example embodiments of the disclosure will become more apparent from the following description taken in conjunction with the accompanying drawings.

FIG. 1 illustrates an example of a network environment of a monitoring system.

FIGS. 2, 3A, 3B, and 4 are views for explaining Group Of Video (GOV) and a method of using the GOV.

FIG. 5 is a block diagram of a video providing server and a video playback apparatus according to an example embodiment of the disclosure.

FIG. 6 is a view for explaining a method of providing video data by a video providing server according to an example embodiment of the disclosure.

FIG. 7 is a view for explaining a real time transport protocol (RTP) packet in which a video providing server provides video data according to an example embodiment of the disclosure.

FIG. 8 is a flowchart illustrating a method of providing video data according to an example embodiment of the disclosure.

FIG. 9 is a flowchart illustrating a method of playing back a video according to an example embodiment of the disclosure.

FIG. 10 is flowchart illustrating a method of playing back a video according to an example embodiment of the disclosure.

DETAILED DESCRIPTION

Example embodiments will be described in detail in order to allow those skilled in the art to practice the disclosure. It should be appreciated that various embodiments of the disclosure are different, but are not necessarily exclusive. For example, specific shapes, configurations, and characteristics described in an example embodiment of the disclosure may be implemented in another embodiment without departing from the spirit and the scope of the disclosure. In addition, it should be understood that positions and arrangements of individual components in each disclosed embodiment may be changed without departing from the spirit and the scope of the disclosure. Therefore, the detailed description provided below should not be construed as being restrictive. In addition, the scope of the disclosure is defined only by the accompanying claims and their equivalents if appropriate. Like reference numerals refer to like elements throughout the specification.

Unless otherwise defined, all terms including technical and scientific terms used herein have the same meaning as commonly understood by one of ordinary skill in the art to which the disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The terms used herein is for the purpose of describing particular embodiments only and are not intended to be limiting. As used herein, the singular forms "a," "an" and "the" are intended to include the plural forms as well, unless the context clearly indicates otherwise. It will be further understood that the terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

Hereinafter, example embodiments of the disclosure will be described in detail with reference to the accompanying drawings.

FIG. 1 illustrates an example of a network environment of a monitoring system. Referring to FIG. 1, a monitoring system includes a monitoring camera 10, a video providing server 20, and a video playback apparatus 30, which are connected through a network. The video providing server 20 receives a video obtained by the monitoring camera 10 through the network and stores the video. The stored video is processed and transmitted to the video playback apparatus 30 through the network to be played back by the video playback apparatus 30. The video playback apparatus 30 displays the video received from the video providing server 20 through the network and provides the displayed video to a user.

FIGS. 2, 3A, 3B, and 4 are views for explaining Group Of Video (GOV) and a method of using the GOV.

As shown in FIG. 2, ten frames including one intra frame 21 and nine inter frames 22 may constitute one GOV 23. In order to minimize a network bandwidth or a storage bandwidth, a GOV value may be set to a large value. As shown in FIGS. 3A and 3B, a transmission bit rate decreases as a GOV increases. That is, the transmission bit rate of the GOV including fifteen frames may be 2 Mbps, and the transmission bit rate of the GOV including eight frames may be 2.5 Mbps.

When the GOV value is set to a large value, the frequency of intra frames capable of independent decoding decreases when playing back a recorded video, so that there may be a difference between playback request time and playback time of an actual video. For example, referring to FIG. 4, when the user plays back a video 41 at the time of 12:00:00, the storage device selects one of a video 43 at 11:59:58 and a video 45 at 12:00:05, in which the nearest intra frame of the video 41 is stored, and transmits the selected video.

FIG. 5 is a block diagram of a video providing server and a video playback apparatus according to an example embodiment of the disclosure.

A video providing server 110 according to an example embodiment of the disclosure includes a communication interface 111, a processor 112. The video providing server 110 may further include a memory 113. The processor 112 may include one or more processors and the memory 113 may include one or more memory.

The communication interface 111 receives video playback time from a video playback apparatus 120, and transmits video data to the video playback apparatus 120 by a unit of frame.

More specifically, the communication interface 111 receives, from the user, video playback time, which corresponds to a location of a video at which the video playback apparatus 120 intends to start the playback of the video. Then, the communication interface 111 transmits the video data for the requested video to the video playback apparatus 120 by a unit of frame.

The communication interface 111 is connected to the video playback apparatus 120 through a network, and may transmit and receive data. The network may be a general purpose network or an individual network. In the case of the monitoring system, a secure network may be used for security.

The communication interface 111 may be connected to an image capturing apparatus through a network or the like to receive an image captured by the image capturing apparatus, and may store the received image in the memory 113.

The processor 112 detects an intra frame positioned before the video playback time, and processes video frame transmission such that frames from the detected intra frame to a frame, which is positioned immediately before the frame corresponding to the video playback time, are transmitted without speed limitation, and frames from the frame corresponding to the video playback time are transmitted in accordance with the playback speed of the video playback apparatus.

More specifically, the processor 112 processes video frame transmission so as to transmit the corresponding video frame to the video playback apparatus 120 such that the corresponding video may be played back from the video playback time received from the video playback apparatus 120. The video to be transmitted to the video playback apparatus 120 may be stored in the memory 113. In order to transmit the corresponding video, the processor 112 first detects an intra frame before the video playback time. It is possible that the frame corresponding to the video playback time is not an intra frame capable of decoding and playback but an inter frame that needs relation information with other frames for video playback. In this case, unless transcoding the corresponding frame into an intra frame or changing a codec, information about a previous intra frame and a previous inter frame is needed in order for the video playback apparatus 210 to play back the corresponding frame. Accordingly, the processor 112 detects an intra frame before the video playback time. When the frame corresponding to the video playback time is an intra frame, the processor 112 detects the corresponding frame as an intra frame.

After the processor 112 detects an intra frame before the video playback time, the processor 112 processes video frame transmission so as to transmit frames from the detected intra frame to the frame that is immediately before the frame corresponding to the video playback time. Since the user intends to play back a video from the video playback time, the user does not need to play back a video until the previous frame, and it is desirable to minimize the time interval from when the video playback time is input until when the video is played back. For this purpose, frames from the detected intra frame (i.e., the intra frame before the video playback time) to the frame immediately before the frame corresponding to the video playback time are transmitted without speed limitation. In this case, the video providing server 110 may be an apparatus capable of transmitting frames without speed limitation. In the case of the video providing server 110 that cannot transmit frames without speed limitation, the frame transmission speed may be controlled at the maximum speed at which the frame can be transmitted.

The processor 112 processes video fame transmission so as to transmit frames from the detected intra frame to the frame immediately before the frame corresponding to the video playback time without speed limitation (or at the maximum speed) and transmit the frame corresponding to the video playback time in accordance with the video playback speed of the video playback apparatus. Since the video playback apparatus 120 plays back a video in accordance with a video playback speed from the frame corresponding to the video playback time, the video playback apparatus 120 transmits frames in accordance with the video playback speed at which the video playback apparatus 120 can play back a video. Thus, it is not necessary to rapidly transmit frames without speed limitation from the frames corresponding to the video playback time. Therefore, the processor 112 processes video frame transmission so as to transmit a vide frame in accordance with video playback speed from the frame corresponding to the video playback time. When the frame corresponding to the video playback time is an intra frame, video playback starts from the corresponding frame and video frame transmission is processed so as to transmit video frames in accordance with video playback speed without rapidly transmitting the frames without speed limitation.

FIG. 6 illustrates a process of processing video frame transmission so as to be able to play back a video at the requested video playback time according to an example embodiment of the disclosure. When receiving video playback time 610 of 12:00:00 from the video playback apparatus 120, an intra frame 630 before a frame 620 corresponding to the video playback time 610 is detected. Frames 660 from 11:59:58, which is time 640 of the intra frame 630, to a frame 650, which is immediately before the frame 620 of the video playback time, are continuously transmitted to the video playback apparatus 120 without speed limitation. When the frame 620 corresponding to the video playback time 610 exists at 12:00:00 (670), subsequent frames 680 are transmitted to the video playback apparatus 120 in accordance with the video playback speed.

The processor 112 may process video frame transmission so as to transmit frames from the detected intra frame to the frame immediately before the frame corresponding to the video playback time at the maximum speed. Based on the current resources, the processor 112 may process video frame transmission so as to transmit frames from the detected intra frame to the frame immediately before the frame corresponding to the video playback time at the maximum speed, and may control the communication interface 111 according to the processed video frame transmission. Since the video playback speed according to the video request received from the video playback apparatus 120 is a playback speed after the video playback time, the processor 112 processes frame transmission so as to transmit frames, without speed limitation, at the maximum speed at which the current frame can be transmitted up to the frame immediately before the frame corresponding to the video playback time. The maximum speed at which frames can be transmitted may vary depending on the current network environment or available resources. Further, the maximum speed may vary depending on the number of the video playback apparatuses 120 connected to the video providing server 110, the number of the processes processed by the current processor 112, or the processing speed of the processor 112.

The processor 112 transmits video frames at the maximum speed at which the current fame can be transmitted, in consideration of available resources. The transmission speed may vary depending on the change in available resources even during frame transmission.

Further, the processor 112 may process video frame transmission so as to transmit frames from the intra frame to the frame immediately before the frame corresponding to the video playback time with the highest priority. The corresponding frame is transmitted with the highest priority, and the usage of resources in other processes is reduced, thereby securing available resources to be used for rapidly transmitting the corresponding frame to the video playback apparatus 120. Thus, the processor 112 may transmit frames from the intra frame to the frame immediately before the frame corresponding to the video playback time to the video playback apparatus 120 at the maximum highest speed.

As described above, the frames transmitted to the video playback apparatus 120 are decoded by the video playback apparatus 120, displayed, and provided to the user. Only a video generated from the frame corresponding to the video playback time is displayed, and the frames before the video playback time may be decoded but not displayed. The processor 112 may process video frame transmission to transmit the corresponding information together with frames such that the video playback apparatus 120 may distinguish the frames transmitted without speed limitation from the frames transmitted according to the video playback speed.

When the processor 112 transmits frames from the intra frame to the frame immediately before the frame corresponding to the video playback time, the processor 112 processes video frame transmission to transmit a frame, based on information that the transmitted frame is a frame that requires only decoding by the video playback apparatus 120. The processor 112 transmits, to the video playback apparatus 120, the frame including information indicating that the transmitted frame is a frame that requires only decoding by the video playback apparatus 120. The video playback apparatus 120 identifies the information that the received frame is a frame that requires only decoding and performs only decoding without performing video playback. Generally, decoding and video playback are performed together, and thus, the performing of decoding and video playback may be set as default. In this case, only when information indicating a frame to be only decoded is included, the corresponding frame may be only decoded, and when information about a frame to be only decoded is not included, decoding and video playback, which are set as default, may be performed.

Alternatively, when the processor 112 transmits the frame corresponding to the video playback time, the processor 112 processes video frame transmission to transmit the frame based on information that the transmitted frame is a frame that requires decoding and video playback by the video playback apparatus 120. In the case of the frame corresponding to the video playback time, the video playback apparatus 120 needs to perform video playback or rendering as well as decoding, so that the processor 112 may process video frame transmission to transmit the corresponding information together with the frame.

The video playback apparatus 120 for playing back a video from the requested video playback time includes a communication interface 121, a decoder 122, a display 123, and a processor 124, and may further include a user interface (not shown) and at least one memory (not shown).

The communication interface 121 transmits video playback time to the video providing server 110, and receives video data from the video providing server 110 by a unit of frame.

More specifically, the communication interface 121 transmits the video playback time received from the user to the video providing server 110. The video playback time may be received from the user through the user interface. The communication interface 121 transmits the corresponding video playback time to the video providing server 110, and receives video data for the corresponding video by a unit of frame. The communication interface 121 may communicate with the video providing server 110 through a network.

The communication interface 121 receives the frame from the video providing server 110 without speed limitation until the frame immediately before the frame corresponding to the video playback time. In order to play back a video from the video playback time as fast as possible, the communication interface 121 receives the frame from the video providing server 110 without speed limitation until the frame immediately before the frame corresponding to the video playback time, which is necessary for providing a video corresponding to the video playback time, is received. In this case, the communication interface 121 may receive the frame at the maximum speed at which the video providing server can transmit the frame until the frame immediately before the frame corresponding to the video playback time is received.

The decoder 122 decodes the frame received from the video providing server 110.

More specifically, since the frame received from the video providing server 110 is encoded by the video providing server 110, the decoder 122 decodes the received frame. In order to play back a video by decoding the frame corresponding to the video playback time, information about the previous intra frame and inter frames before the corresponding intra frame is required, so that all the received vide frames are decoded.

The display 123 displays a video generated by decoding the received frame, and displays only a video from the frame corresponding to the video playback time.

More specifically, the display 123 may display a video generated by the decoding of the fame by the decoder 122 to play back the video, and may display a video generated by the decoding through rendering. After receiving the video playback time from the user, although the frames received from the video providing server 110 according to the corresponding information are decoded by the decoder 122, the display 123 does not display all videos generated by decoding but displays only a video generated from the frame corresponding to the video playback time to play back the video, and does not display a video generated from the frame before the video playback time. Since the user requests to play back a video from the video playback time through the input of the video playback time, available resources may be secured such that the decoder 122 may decode frames to be received quickly without playing back the video corresponding to time previous to the video playback time. Since the frames before the video playback time are received without speed limitation, decoding needs to be processed rapidly. Therefore, the display 123 does not play back the video during the period before the video playback time, and thus available resources may be used as much as possible for frame decoding.

The display 123 plays back a video according to a video playback speed from the frame corresponding to the video playback time. If there is a video playback speed received from the user, the video is played back at the video playback speed, and if there is no video playback speed received from the user, the video is played back at a default video playback speed. The default video playback speed may be 1× speed (i.e., normal speed).

The processor 124 may determine whether the received frame is a frame that requires only decoding or a frame that requires decoding and video playback. The frames before the video playback time perform only decoding, and the frames from the video playback time perform decoding and video playback, so that the processor 124 determines whether the corresponding frame is a frame that requires only decoding or a frame that requires decoding and video playback, from information received together with the frame.

When the received frame is a frame that requires only decoding, the processor 124 may control the decoder 122 and the display 123 such that the received frame is decoded by the decoder 122 and the display does not display a video. When the received frame is a frame that requires decoding and video playback, the processor 124 may control the decoder 122 and the display 123 such that the decoder 122 decodes the received frame using the previously decoded frame to generate a video and the display 123 plays back the generated video.

As described above, a video may be rapidly played back in accordance with the video playback time requested by the user directly using a setting or environment in which a GOV value is large, without changing GOV setting or codec setting through the mutual operation between the video providing server 110 and the video playback apparatus 120.

A process for playing back a video from the video playback time between the video providing server 110 and the video playback apparatus 120 is performed by communication between the video providing server 110 and the video playback apparatus 120. Specific example of the process will be described with reference to protocol real time streaming protocol (RTSP) (rfc 2326). However, this is merely an example, and various protocols may be used. When using its own protocol, the process may be performed through signal transmission and reception at one time.

First, it is determined whether the apparatus is capable of transmitting and receiving at the time of DESCRIBE without speed limitation.

(Video playback apparatus→video providing server)
DESCRIBE rtsp://192.168.0.1 RTSP/1.0
Cseq: 1
User-Agent: Wisenet RTSP client
Accept: application/sdp
Require: www.hanwha-security.com/ver10/playback Then, a reply as to whether transmission and reception are possible without speed limitation is transmitted from the video providing server.

(Video providing server→video playback apparatus)
<If not supported>
RTSP/1.0 551 Option not supported
Cseq: 1
Unsupported: www.hanwha-security.com/ver10/playback
<If supported>
RTSP/1.0 200 OK
Cseq: 1
Content-Type: application/sdp
Content-Length: xxx When it is determined that the video providing server is capable of transmission and reception without speed limitation, a play request is transmitted from the video playback apparatus to the video providing server.

(Video playback apparatus→video providing server)
PLAY rtsp://192.168.0.1/path/to/recording RTSP/1.0
Cseq: 123
Session: 12345678
Require: www.hanwha-security.com/ver10/playback
Range: clock=20180815T120000.440Z-
Rate-Control: Yes
Scale: 1.0

Then, in order to distinguish a section frame requiring only decoding from the video providing server to the video playback apparatus from a section frame requiring decoding and rendering (video playback), as shown in FIG. 7, an extension header 710 may be defined in a real time transport protocol (RTP) packet.

Extension Header ID: 0xBBDD (here, Extension Header ID is a unique extension header ID)

Extension Header Length: n (here, Extension Header Length is a header length)

Header filed: includes Flag information indicating whether the section frame needs only decoding. The video playback apparatus continuously performs only video decoding and does not perform video displaying while the Flag information is set to a corresponding value. When the Flag information is not set to the corresponding value, the video playback apparatus performs normal decoding and video playback. The time information of the corresponding frame may be ignored in the video playback apparatus.

FIG. 8 is a flowchart illustrating a method of providing video data according to an example embodiment of the disclosure, FIG. 9 is a flowchart illustrating a method of playing back a video according to an example embodiment of the disclosure, and FIG. 10 is flowchart illustrating a method of playing back a video according to another example embodiment of the disclosure.

The detailed description of the method of providing video data according to an example embodiment of the disclosure corresponds to the detailed description of the video providing server of FIGS. 1 to 7, and the detailed description of the method of playing back a video according to an example embodiment of the disclosure corresponds to the detailed description of the video playback apparatus of FIGS. 1 to 7. Therefore, hereinafter, a duplicate description will be omitted.

In the method of providing video data according to an example embodiment of the disclosure, in order for a video providing server to provide video data so as to enable video playback from the requested video playback time, in S11, video playback time is received from a video playback apparatus; in S12, an intra frame before the video playback time is detected; and in S13, frames from the intra frame to a frame immediately before a frame corresponding to the video playback time are transmitted without speed limitation.

In this case, in the transmission of the frames from the intra frame to the frame immediately before the frame corresponding to the video playback time without speed limitation, the frames may be transmitted at the maximum speed, and the corresponding frame may be transmitted with the highest priority.

Then, in S14, from the frame corresponding to the video playback time, the frames are transmitted in accordance with the playback speed of the video playback apparatus.

When the frames from the detected intra frame to the frame immediately before the frame corresponding to the video playback time are transmitted without speed limitation, the frames may be transmitted based on information that the transmitted frame is a frame to be only decoded by the video playback apparatus. When the frames from the frame corresponding to the video playback time are transmitted in accordance with the playback speed of the video playback apparatus, the frames may be transmitted based on information that the transmitted frame is a frame to be decoded and played back by the video playback apparatus.

In the method of playing back a video according to an example embodiment of the disclosure, in order for a video playback apparatus to play back a video from the requested video playback time, in S21, video play back time is transmitted to a video providing server; in S22, frames up to a frame immediately before a frame corresponding to the video playback time are received from the video providing server and the frames are decoded; and in S23, frames after the frame corresponding to the video playback time are received from the video providing server, and decoding and video playback are performed.

In S22, when the frames up to the frame immediately before the frame corresponding to the video playback time are received, the frames may be received without speed limitation, and the frames may be received at the maximum speed at which the video providing server can transmit the frames.

Operation S22 may be performed in S31 to S33. In S 31, a frame is received from the video providing server, and in S32, whether the received frame is a frame that requires only decoding or a fame that requires decoding and video playback is determined. As the result of determination in S32, when the received frame is a frame that requires only decoding, the received frame may be decoded in S33.

Operation S23 may be performed in S31, S32, and S34. In S 31, a frame is received from the video providing server, and in S32, whether the received frame is a frame that requires only decoding or a fame that requires decoding and video playback is determined. As the result of determination in S32, when the received frame is a fame that requires decoding and video playback, the received frame is decoded using the previously received and decoded frame to generate a video, and the generated video may be played back.

According to the disclosure, it is possible to quickly play back a video in accordance with video playback time requested by the user without changing GOV setting or codec setting.

Embodiments of the disclosure may be implemented in the form of program commands that can be executed through various computer means and recorded in a computer-readable recording medium. The computer-readable recording medium may include program instructions, data files, data structures, and the like, alone or in combination. The program commands recorded in the medium may be those specially designed and configured for the disclosure or may be those available to those skilled in the art of computer software. Examples of the computer-readable recording medium may include magnetic media such as hard disk, floppy disk, and magnetic tape; optical recording media such as CD-ROM and DVD; magneto-optical media such as floptical disk; and hardware devices configured to store and execute program commands, such as ROM, RAM, and flash memory. The computer-readable recording medium may be implemented in the form of a carrier wave (for example, transmission through internet). The computer readable recording medium may be distributed over a networked computer system, so that computer-readable codes may be stored and executed in a distribution manner. The functional programs, codes and code segments for implementing the disclosure may be easily deduced by programmers skilled in the art to which the disclosure pertains. Examples of program commands include not only machine language codes such as those made by a compiler but also high-level language codes that may be executed by a computer using an interpreter or the like. The above-described hardware devices may be configured to operate as one or more software modules to perform the operations of the disclosure, and the reverse thereof is possible.

Although the example embodiments of the disclosure have been described for illustrative purposes, those skilled in the art will appreciate that various modifications, additions and substitutions are possible, without departing from the scope and spirit of the disclosure in the accompanying claims and their equivalents.

The invention claimed is:

1. A method of providing video data, performed by a video providing server, the method comprising:
   receiving, from a video playback apparatus, a video playback time of a video;
   detecting, in the video, an intra frame which is positioned before a first frame corresponding to the video playback time and is closest to the first frame among intra frames in the video;
   transmitting frames from the intra frame to a second frame, the second frame being positioned immediately before the first frame, without speed limitation; and
   transmitting a frame from the first frame in accordance with a playback speed of the video playback apparatus,
   wherein the transmitted frames contain information indicating whether the video playback apparatus needs to only decode the transmitted frames or both decode and play back the transmitted frames, and
   wherein the information is recorded in headers of the transmitted frames.

2. The method of claim 1,
   wherein the transmitting the frames comprises transmitting the frames from the intra frame to the second frame at a maximum transmission speed.

3. The method of claim 1,
   wherein the transmitting the frames comprises transmitting the frames from the intra frame to the second frame with a highest priority.

4. The method of claim 1,
   wherein the transmitting the frames comprises transmitting the frames from the intra frame to the second frame, based on information indicating that each of the transmitted frames is a frame that requires decoding by the video playback apparatus without video playback.

5. The method of claim 1,
   wherein the transmitting the frame comprises transmitting the frame from the first frame in accordance with the playback speed of the video playback apparatus, based on information indicating that the transmitted frame is a frame that requires decoding and playback by the video playback apparatus.

6. A method of playing back a video, performed by a video playback apparatus, the method comprising:
   transmitting a video playback time of a first video to a video providing server, the video playback time corresponding to a first frame in the first video;
   receiving, from the video providing server, frames up to a second frame positioned immediately before the first frame in the first video and performing first decoding of the received frames up to the second frame; and
   receiving, from the video providing server, frames from and after the first frame and performing second decoding and video playback of the received frames from the first frame,
   wherein the frames up to the second frame are received from the video providing server without speed limitation and the frames from and after the first frame are received from the video providing server in accordance with a playback speed of the video playback apparatus,
   wherein the received frames contain information indicating whether the video playback apparatus needs to only decode the received frames or both decode and play back the received frames, and
   wherein the information is recorded in headers of the received frames.

7. The method of claim 6,
   wherein the receiving the frames up to the second frame comprises receiving, from the video providing server, the frames up to the second frame at a maximum speed at which the video providing server is capable of transmitting the frames.

8. The method of claim 6,
   wherein the receiving the frames up to the second frame and performing the first decoding includes:
   receiving a frame from the video providing server;
   determining whether the received frame is a frame that requires decoding without video playback or a frame that requires decoding and video playback; and
   decoding the received frame based on a determination that the received frame is the frame that requires decoding without video playback.

9. The method of claim 6,
   wherein the receiving the frames from and after the first frame and performing the second decoding and video playback includes:
   receiving the frame from the video providing server;
   determining whether the received frame is a frame that requires decoding and does not require video playback or a frame that requires decoding and video playback; and
   decoding the received fame using a previously received and decoded frame to generate a second video and playing back the generated second video, based on a determination that the received frame is the frame that requires decoding and video playback.

10. A video providing server, comprising:
    a communication interface configured to receive a video playback time of a video from a video playback apparatus and transmit video data to the video playback apparatus by a unit of frame; and
    at least one processor configured to:
    detect, in the video, an intra frame which is positioned before a first frame corresponding to the video playback time and is closest to the first frame among intra frames in the video;
    transmit, via the communication interface, frames from the intra frame to a second frame, the second frame being positioned immediately before the first frame without speed limitation; and
    transmit, via the communication interface, a frame from the first frame in accordance with a playback speed of the video playback apparatus,
    wherein the transmitted frames contain information indicating whether the video playback apparatus needs to only decode the transmitted frames or both decode and play back the transmitted frames, and
    wherein the information is recorded in headers of the transmitted frames.

11. The video providing server of claim 10,
wherein the at least one processor is further configured to transmit, via the communication interface, the frames from the intra frame to the second frame at a maximum speed.

12. The video providing server of claim 10,
wherein the at least one processor is further configured to transmit, via the communication interface, the frames from the intra frame to the second frame with a highest priority.

13. The video providing server of claim 10,
wherein the at least one processor is further configured to transmit the frames from the intra frame to the second frame based on information indicating that each of the transmitted frames is a frame that requires decoding by the video playback apparatus without video playback.

14. The video providing server of claim 10,
wherein the at least one processor is further configured to transmit the frame from the first frame based on information indicating that the transmitted frame is a frame that requires decoding and video playback by the video playback apparatus.

15. A video playback apparatus, comprising:
a communication interface configured to transmit a video playback time of a first video to a video providing server and receive video data from the video providing server by a unit of frame;
a decoder configured to decode a frame received from the video providing server; and
a display configured to display a second video generated by decoding the received frame,
wherein the second video is generated from a first frame corresponding to the video playback time,
wherein the received frame contains information indicating whether the video playback apparatus needs to only decode the received frame or both decode and play back the received frame, and
wherein the information is recorded in a header of the received frame.

16. The video playback apparatus of claim 15,
wherein the communication interface is further configured to receive the frame from the video providing server without speed limitation up to a second frame, the second frame being positioned immediately before the first frame.

17. The video playback apparatus of claim 15,
wherein the communication interface is further configured to receive the frame from the video providing server without speed limitation up to a second frame, the second frame being positioned immediately before the first frame, at a maximum speed at which the video providing server is capable of transmitting the frame.

18. The video playback apparatus of claim 15, further comprising:
at least one processor configured to determine whether the received frame is a frame that requires decoding without video playback or a frame that requires decoding and video playback.

19. The video playback apparatus of claim 18,
wherein the at least one processor is further configured to control the decoder and the display such that the decoder decodes the received frame and the display does not display a video based on the received frame, based on a determination that the received frame is the frame that requires decoding without video playback, and
wherein the at least one processor is further configured to control the decoder and the display such that the decoder decodes the received frame using a previously received and decoded frame to generate the second video, and the display plays back the generated second video, based on a determination that the received frame is the frame that requires decoding and video playback.

* * * * *